United States Patent
Chang et al.

(10) Patent No.: US 6,308,288 B1
(45) Date of Patent: Oct. 23, 2001

(54) TESTING METHOD OF THE INTEGRITY OF THE SOFTWARE PRE-INSTALLED IN A COMPUTER HARD DISK

(75) Inventors: Vam Chang, Taipei (TW); Xian-Hong Shen, Shang Hai (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/232,663

(22) Filed: Jan. 19, 1999

(30) Foreign Application Priority Data

Oct. 27, 1998 (TW) .................................... 87117738

(51) Int. Cl.⁷ ....................................... G06F 11/26
(52) U.S. Cl. ................................... 714/38; 717/4
(58) Field of Search ............................. 714/38, 36, 46; 717/4

(56) References Cited

U.S. PATENT DOCUMENTS 5,537,540 * 7/1996 Miller et al. ......................... 714/38
5,974,567 * 10/1999 Dickson, Jr. et al. ................. 714/27

* cited by examiner

*Primary Examiner*—Robert Beausoleil
*Assistant Examiner*—Scott T. Baderman
(74) *Attorney, Agent, or Firm*—Bacon & Thomas, PLLC

(57) ABSTRACT

The present invention herein relates to a kind of testing method of the integrity of the software pre-installed in a computer hard disk by providing a file information access function to directly read data on the physical magnetic tracks of a hard disk through a lower level operating method, and to obtain and then test the file names, file sizes, file storage locations and other information stored in all partitions (including hidden partitions and normal partitions). The present invention also permits the operator to manually input the names of known files and directories that may be altered during the computer start-up routine in advance to enable the effects of said known files and directories being disregarded during the testing procedures, and, furthermore, to create a standard pre-installed software information file that is compared with a temporary file created from the software information on the hard disk, thereby ensuring that the software pre-installed on a hard disk of computer sold by a manufacturer is reliable and accurate to meet consumers' expectations.

7 Claims, 7 Drawing Sheets

TESTING METHOD OF THE INTEGRITY OF THE SOFTWARE PRE-INSTALLED IN A COMPUTER HARD DISK

BACKGROUND OF THE INVENTION

Due to the advances in electronic technology in recent years, computer and peripheral product capability has constantly improved and been accompanied by a range of new software releases. At the same, the lower prices of computers, computer peripherals, and software have enabled these products to become common in our daily work, study and life. Since consumer demand has caused rapid growth and major computer and computer peripheral product manufacturers face a newly expanded consumer market that requires sufficient capability, large manufacturers must promote their products as more attractive to mass consumers and thereby gain profitable market positions in a challenging and competitive market. When consumers purchase computers, various software packages are pre-installed on the hard disks to persuade consumers to purchase the computer and peripheral products. Since the Windows is the well-known and most common operating system, newly purchased computers are equipped with authorized versions licensed by the Microsoft Corporation. Other pre-installed applications including general consumer demand software packages as well as special accessory software developed by manufacturers for their various models, with the installation of the aforesaid software not only allowing consumers to operate computer more easily, but also providing computer manufacturers a profitable market development opportunity.

DESCRIPTION OF THE PRIOR ART

In general, manufacturers do not utilize ordinary copy commands and installation programs to install software on the hard disks of the various models of computers produced. To complete the copying process on the assembly line on a daily basis, operators utilize a manual method to complete the copying process on thousands of hard disks. The aforesaid method is a tedious process that not only consumes large amounts of manpower, time and costs, but also is not a fully reliable software copying approach.

Before any operating system is installed on a hard disk, the conventional method involves the utilization of a lower level method to install the aforesaid software directly on the magnetic tracks of a hard disk. However, in the utilization of the aforesaid kind of special data copying method, the software installation process onto the aforesaid hard disk ignores the normally installed testing procedure. As such, the operator is unaware the data write errors that are occurring during the installation process, the integrity of the software installation is totally dependent on the hardware equipment operating reliability.

The hard disk being installed with software via the aforesaid conventional method can be tested generally under the disk operating system (DOS) environment by testing files size, file attributes, and other data in the directory areas to ensure the correction of the installation. However, it is incapable of conducting a detailed testing of the actual software section (the software data stored on the hard disk) and thereby determining the integrity of software. During the conventional process of software installation, since impact during installation can result in data writing errors, computer manufacturers obviously cannot guarantee to consumers purchasing a computer with pre-installed software that the computer and included software will operate reliably, which results in numerous unnecessary consumer disputes and difficulties.

Furthermore, in addition to installing application software on hard disks in computers, many manufacturers also arrange a hidden storage space on the hard disk, as shown in FIG. 1, for installing their own developed maintenance software on hard disks and preventing them from being poorly operated, accidentally altered and deleted. And, said manufacturers utilize the method of changing the master boot record on a hard disk to let said storage space become invisible to various operating systems (including DOS/ Windows and NT/UNIX, etc.). Therefore, the aforesaid storage space cannot be read or written by the user through conventional methods and are referred to as hidden partitions. Under the aforesaid environments, the aforementioned testing methods are incapable of testing the correctness of files in the aforesaid hidden partitions.

SUMMARY OF THE INVENTION

Since conventional methods of testing software pre-installed on hard disks are incapable of conducting test for completeness and correctness, which, furthermore give rise to countless after-sales problems. The invention herein is capable of conducting a complete and, furthermore, reliable scientific test for the pre-installed software by providing a comprehensive and high standard testing method for creating both hidden partition files and regular partition files on a hard disk to ensure manufacturers that the internally pre-installed software of computers is reliable and correct enough to meet consumers' expectations.

The primary objective of the invention herein is to provide a kind of file information access function that replaces the original disk operating system (DOS) interface through a lower level method which directly reads data from the physical magnetic tracks on a hard disk to obtain the names, sizes, and file location information stored in all partitions (including the aforesaid hidden partition and regular partitions) and thereby enable the later testing procedures testing the correctness and completeness of the software on the hard disk.

Another objective of the invention herein is to prevent the generation of erroneous information during the testing process due to the register and swap files that are internally created and altered by the operating system during the start-up routine of a computer by allowing the operator to manually input known file and directory names beforehand, which enables the testing procedures of the invention herein to disregard the effects of the aforesaid known file and directory names and thereby create a standard software information file that can be utilized during the later testing procedures.

Yet another objective of the invention herein is to ensure the normality of creating the standard installed software information by adding a test for the normality of the information record during the comparison of the standard pre-installed software file information and the file information of the hard disk undergoing testing, which creates a temporary file of the software information on the hard disk and, furthermore, is stored in a file as the standard pre-installed software record after the compared results are verified as identical.

DETAILED DESCRIPTION OF THE INVENTION

Figure 1:
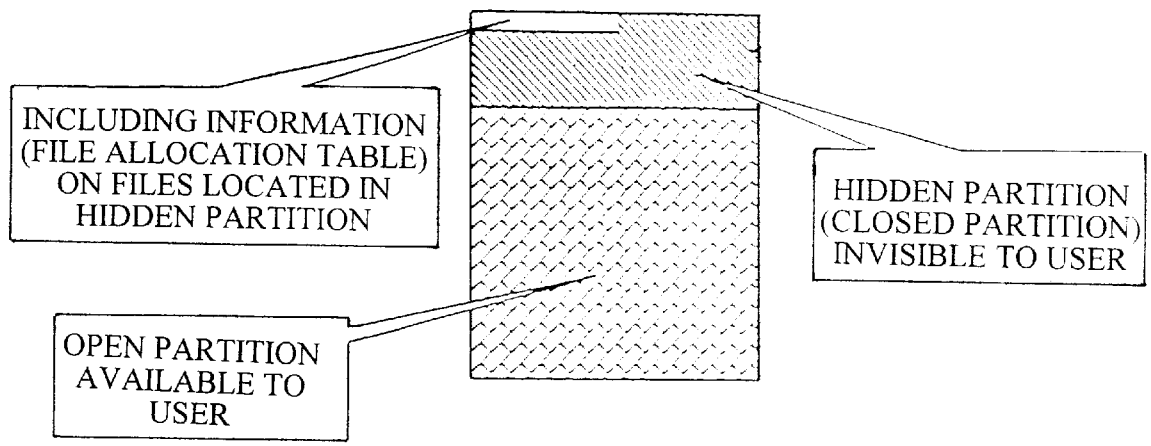
FIG. 1 is a drawing of a digital storage structure on a hard disk.
Figure 2:
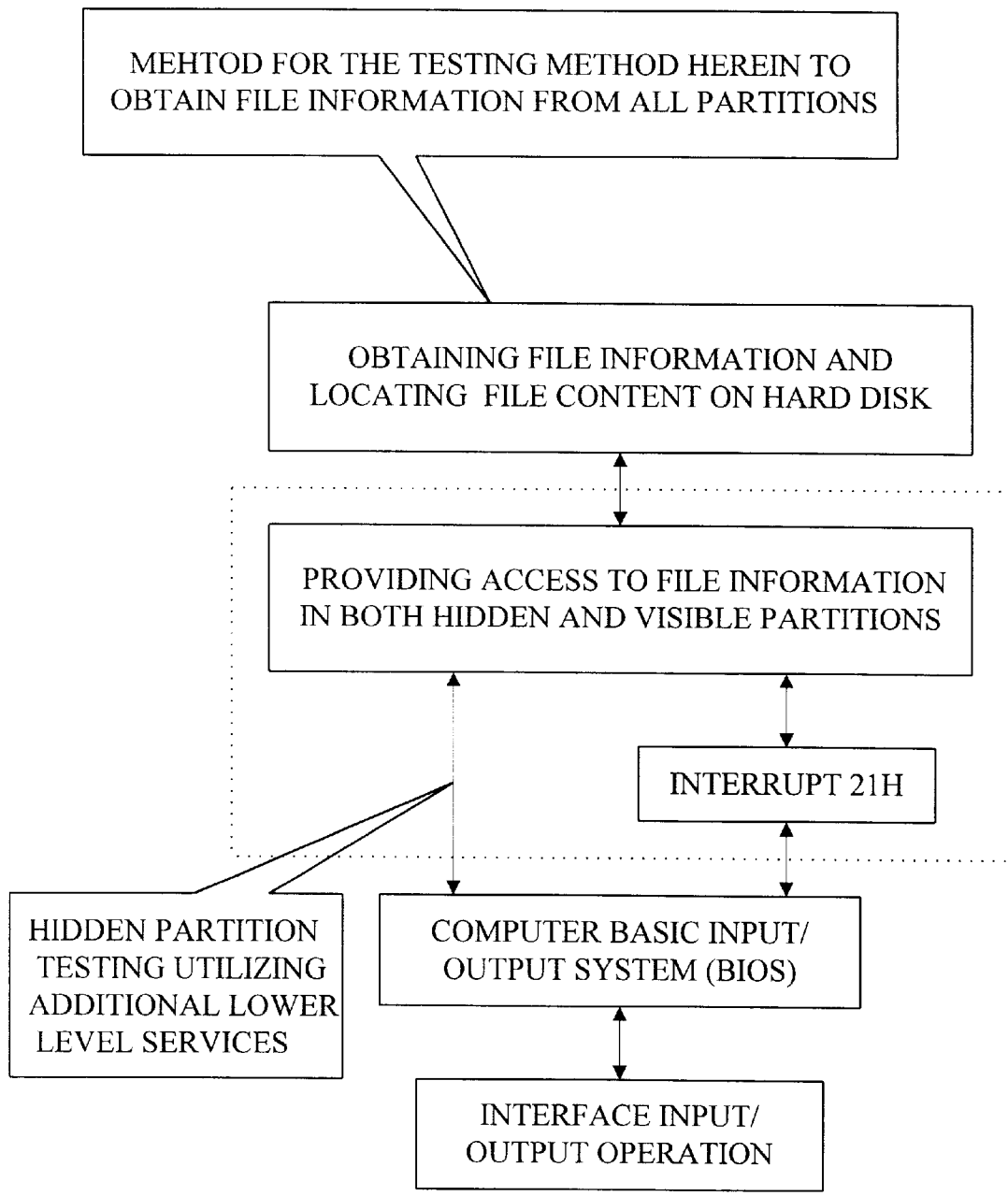
FIG. 2 is a flowchart diagram of the invention herein utilizing a kind of file information access function through a lower level method directly reading the hard disk physical magnetic track to obtain information stored all partitions.

In order to enable software files stored in the hidden partitions on a hard disk to become visible for viewing, revision or deletion, the invention utilizes the method bypassing the disk operating system (DOS) file management, referring to FIG. 2, to provide a kind of file information access function replacing the original DOS file management interface through a lower level operating method, and directly reading data on the physical magnetic tracks of a hard disk and obtaining file names, file sizes, file storage locations, and other information stored in all partitions (including hidden partitions and normal partitions), and testing the software pre-installed on the hard disk for accuracy and integrity during the later testing process of the invention.

Figure 3:
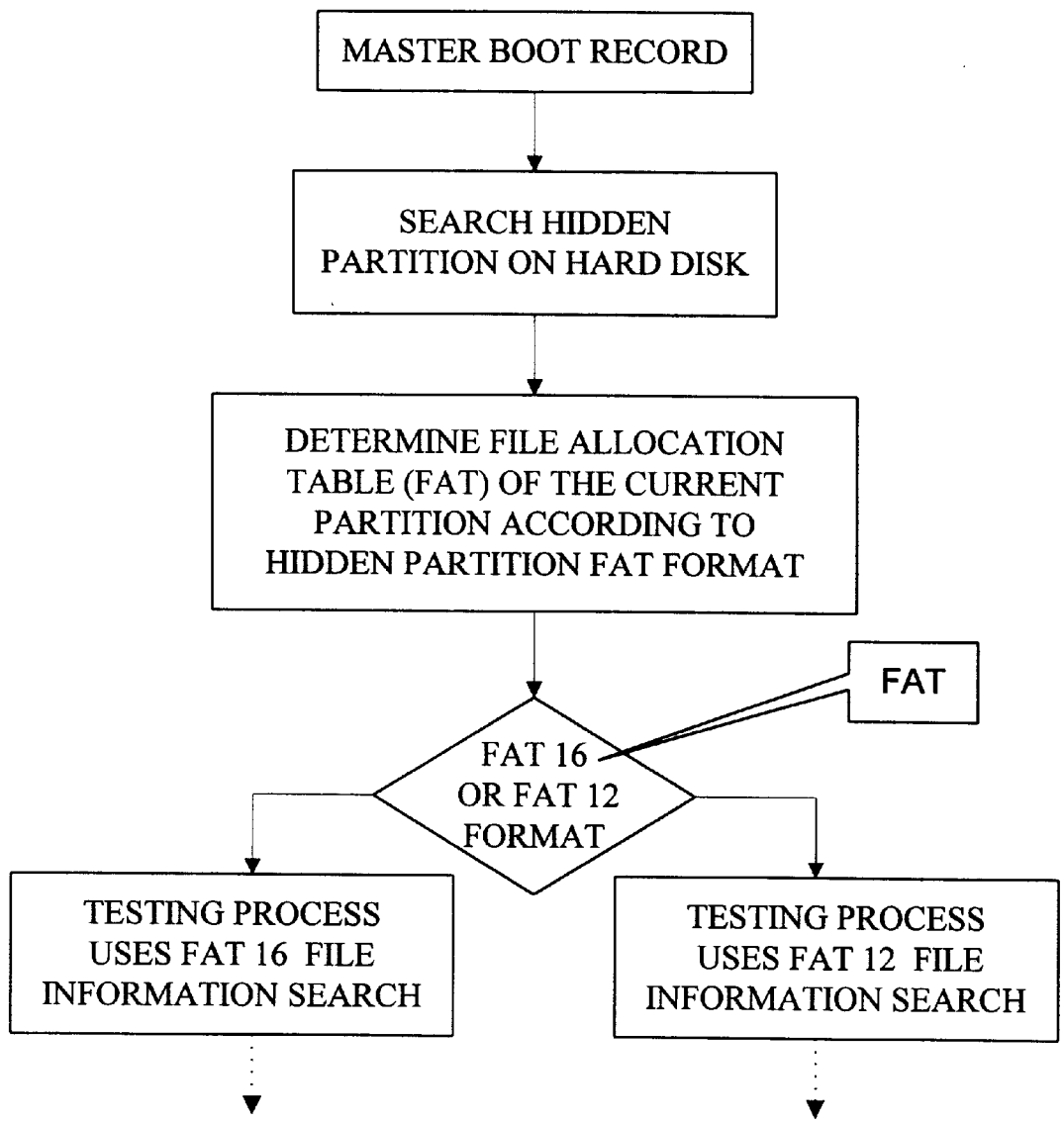
FIG. 3 is a flowchart diagram of the invention herein illustrating the automatic identification of the files being utilized in the file allocation table (FAT) based on the FAT in hidden partition.

When a computer manufacturer sells a computer, since the master boot record identification (media descriptor byte) in a hidden partition on the hard disk has been altered, all software files being pre-installed in said partition perhaps be defined by the manufacturer as a 12-bit or a 16-bit file allocation table (FAT) format for storage. Therefore, in order to automatically recognize the FAT format of the aforesaid hard disk and, as indicated in FIG. 3, the invention reads the master boot record on said hard disk and searches for the hidden partition on said hard disk and, then according to different types of FAT format in said hidden partition, determines what type of FAT (such as FAT16 or FAT12) is utilized in the aforesaid hidden partition based on the different functions equipped with the invention and, furthermore, with respect to the particular type of FAT, obtains the name, size, location, and other information about the files stored in the hidden partition, enabling the invention herein to totally access different types of FAT format in hard disks, including the hidden partitions in hard disks, and, furthermore, analyzing the FAT structure and type and thereby obtaining the file information stored in the hidden partitions.

When testing software pre-installed on a hard disk, the invention herein mainly provides the following three different test command options:

(1) Create a standard information file of the software pre-installed on the hard disk.

(2) Test the correctness of the software currently pre-installed on the hard disk.

(3) Provide the information stored in all hard disk partitions to the operator.

At the same time, the aforesaid three options have selectable parameters that are chosen by the operator before the testing process is executed.

During the start-up routine of a computer, the operating system contains a number of register and swap files of which the contents may be altered during the start-up process. If said files are altered when the computer is initialized and as the operator is conducting a test to the software pre-installed on a hard disk. The file changes will be recorded during the testing process and, furthermore, be interpreted as errors, which will cause unnecessary confusions to the operator in the testing process.

Figure 4:
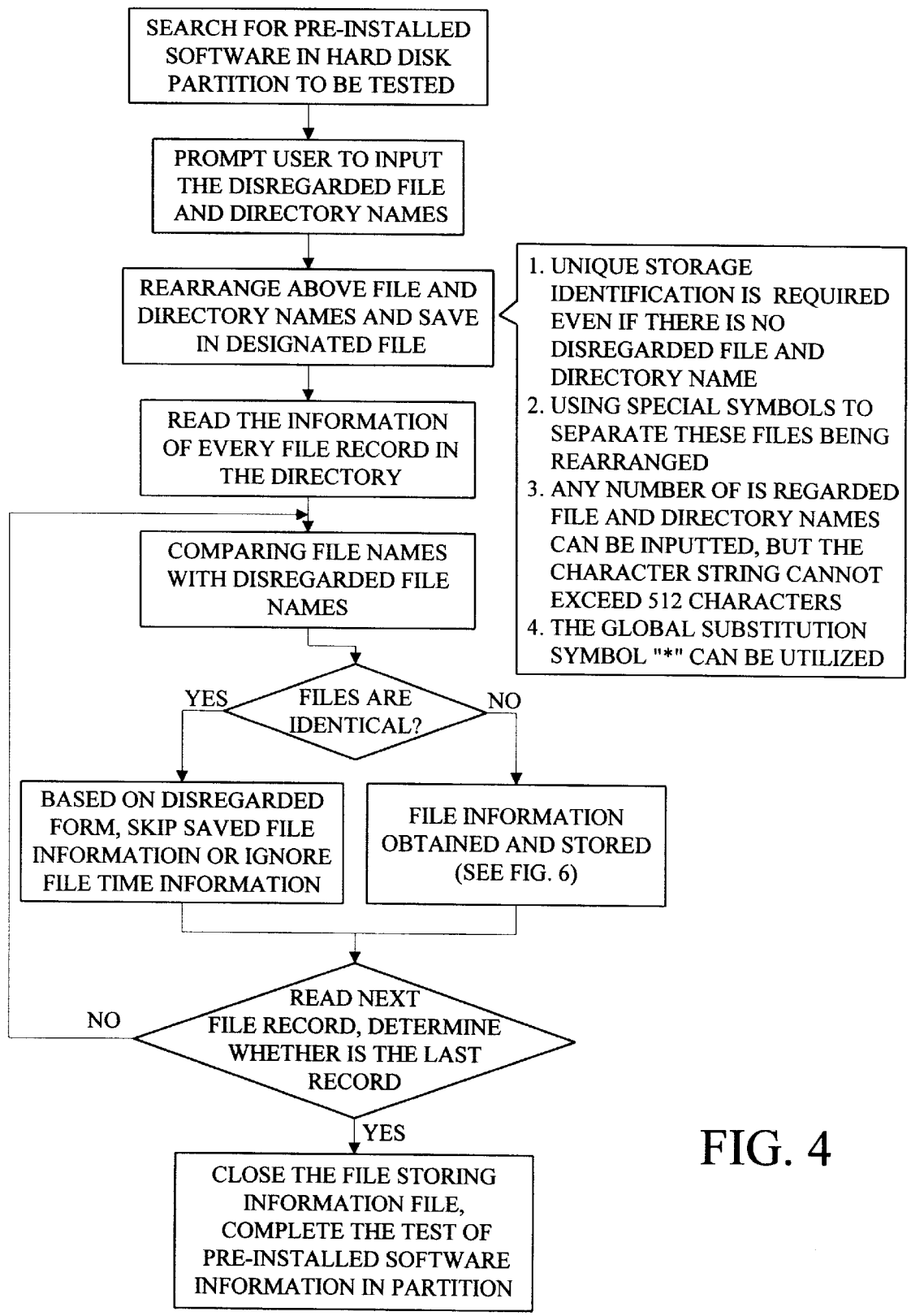
FIG. 4 is a flowchart diagram of the invention herein, in which the operator allowed to manually input the names of known files or directories to disregard the aforesaid known files or directories and, furthermore, create the standard pre-installed software information of the hard disk.

To avoid the aforesaid possible changes in known files or directories that generate data errors, the invention herein permits the operator to input the names of the known files and directories by using a manual method according to the following procedures, referring to FIG. 4, which enables the invention to disregard the aforesaid known files and directories and produce the standard pre-installed software information files that will be used in the later testing process:

(1) After the invention herein first searches the hard disk partitions for the software pre-installed on the hard disk under testing, the operator is instructed to input the names of the known files or directories to be disregarded, and then said names of these files and directories inputted by the operator are rearranged and stored in a designated file.

(2) The invention herein sequentially reads the record information of every file in the directories of the aforesaid hard disk and compares said information with said the names of the known disregarded files or directories; if the names are identical, the storage or time information of the disregarded files are skipped according the disregarded form; otherwise, the file information obtained is stored.

(3) After reading and comparing every file record in the directories of the aforesaid hard disk, the invention herein closes all the information files of the pre-installed software that were tested and, furthermore, indicates completion and generates a standard pre-installed software information file.

During the aforementioned procedures, the invention herein allows the operator to input many types of identical file and directory names and, furthermore, allows the inputting of the global substitution symbol "*" (for example, the expression "*.EXE" includes all files and directories having the extension .EXE). The invention also permits to disregard the file and directory names in several different ways, including disregarding of all file information or disregarding of only the time information. The objective of disregarding of only the time information resides in that if aforesaid files were copied from another hard disk, then the information except time information of the aforesaid files remains identical, then the two files are recognized as being identical and no error information is generated.

Figure 5:
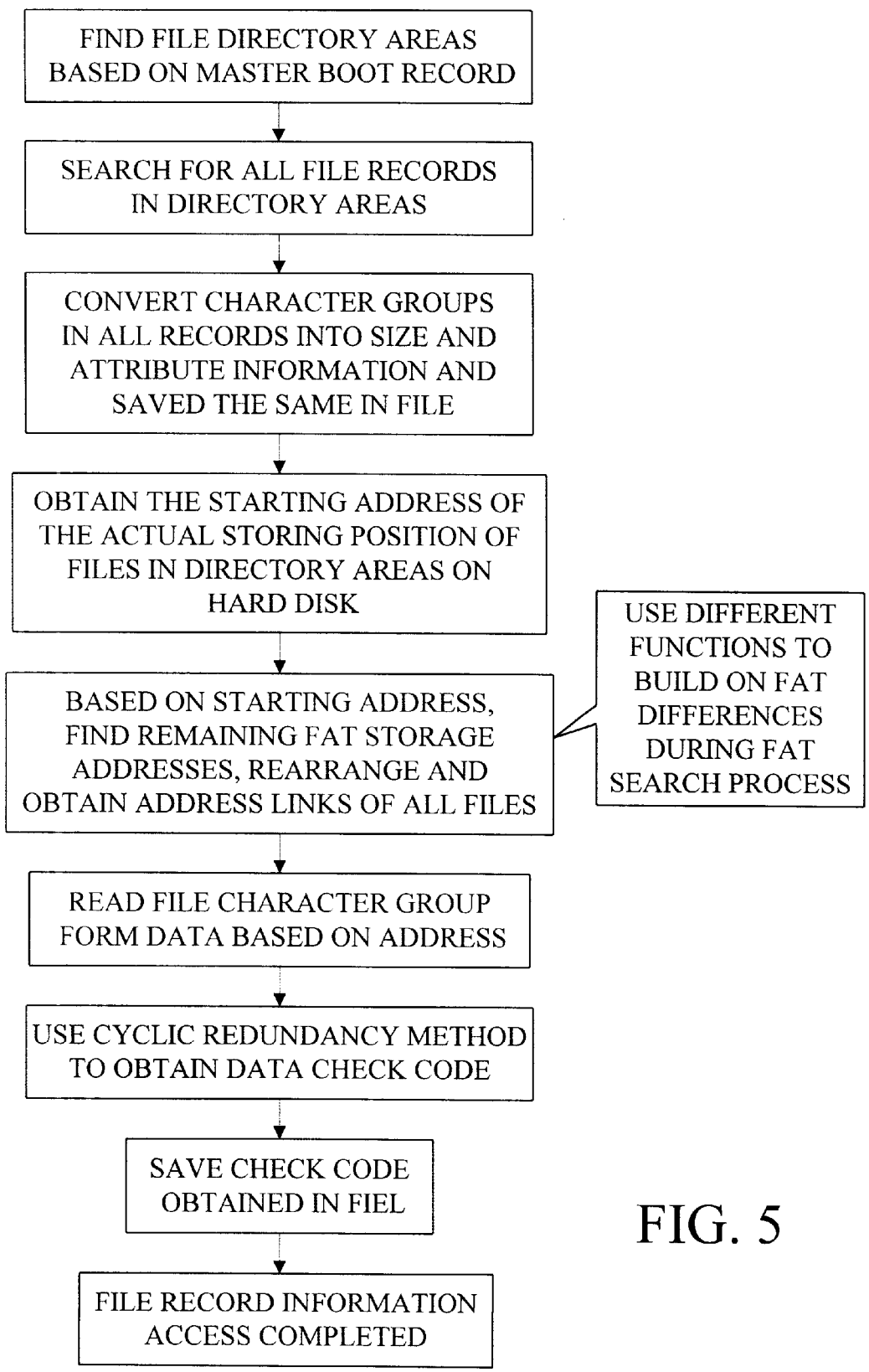
FIG. 5 is a flowchart diagram of the invention herein, the standard pre-installed software information is compared with the files installed on the hard disk.

During the comparison of the disregarded known file and directory names in the directories of the hard disk, this invention uses the following procedures to create the standard pre-installed software information file, as shown in FIG. 5:

(1) According to the master boot record information in the hard disk, the invention herein searches the file directory areas and every file record from said areas; furthermore, the character groups of every file record found during the search are converted into size and attribute and then stored in a file.

(2) Then, obtaining the starting location of the files actually stored on the hard disk from said directory areas, and searching for other storage locations from the FAT according to said starting location and, furthermore, rearranging said locations to obtain the storage address links of the entire file.

(3) According to the aforesaid addresses, the invention herein reads the data formed by the character groups of the file and, obtains a check sum via a cyclic redundancy check operation on the aforesaid data.

(4) Finally, a check code is calculated and stored in the aforesaid file, thereby creating a standard pre-installed software information file.

After creating a standard software information file, the invention herein performs a comparison between said file and the file information of the software pre-installed on the hard disk according to the following procedures, referring to FIG. 5:

(1) The invention herein first searches for all the recorded information of the software pre-installed on the hard disk and then opens the file used to store the file and directory names compared to be identical.

(2) After the file information of the software pre-installed on the hard disk being read, the disregarded known file and directory names are eliminated and the other file information is stored in a temporary file.

(3) The invention then determines whether errors have occurred in the information files of the software pre-installed on said hard disk according to the result of the comparison between said standard pre-installed software information and said temporary file. And, recording the information of errors and providing an indication as a reference to the operator while errors occur.

During the process of comparing the information of said standard pre-installed software with the information contained in said temporary files undergoing hard disk testing, the invention sequentially completes the following tasks:

(1) Recording the size of the hard disk partitions.

(2) Recording the information of the software pre-installed in the hidden partitions of the hard disk.

(3) Recording the information of the software pre-installed in the visible partitions of the hard disk.

To ensure the accuracy of the information of the pre-installed software, the invention executes an additional information record accuracy testing, while comparing the information of the standard pre-installed software with the information of the files undergoing hard disk testing, to create another temporary information file of software with respect to the hard disk and, furthermore, to conduct a comparison of the results twice before saving the standard pre-installed software record in a file.

Figure 6:
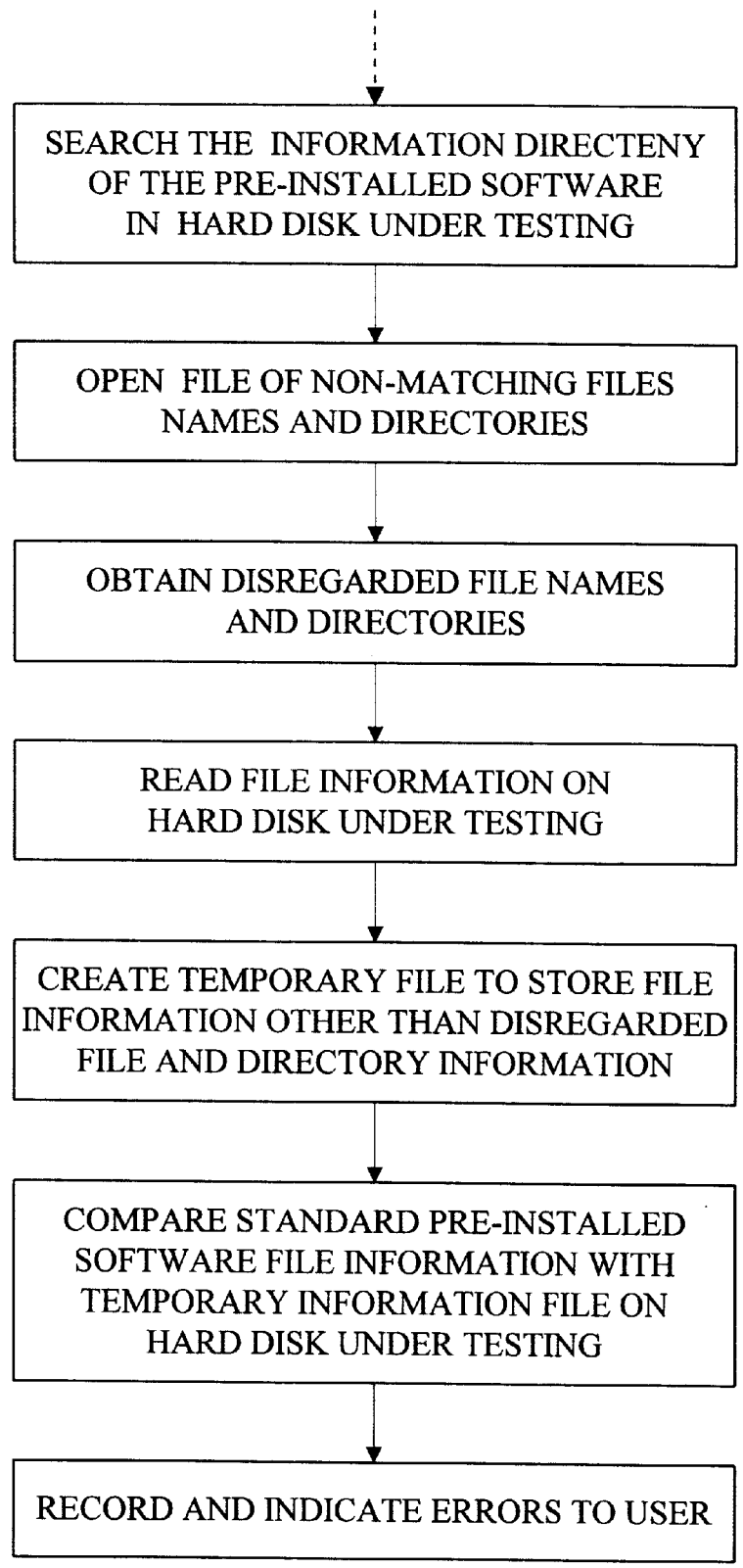
FIG. 6 is a flowchart diagram of the invention, in which a comparison is conducted between the temporary file created and the aforesaid standard pre-installed software information file.
Figure 7:
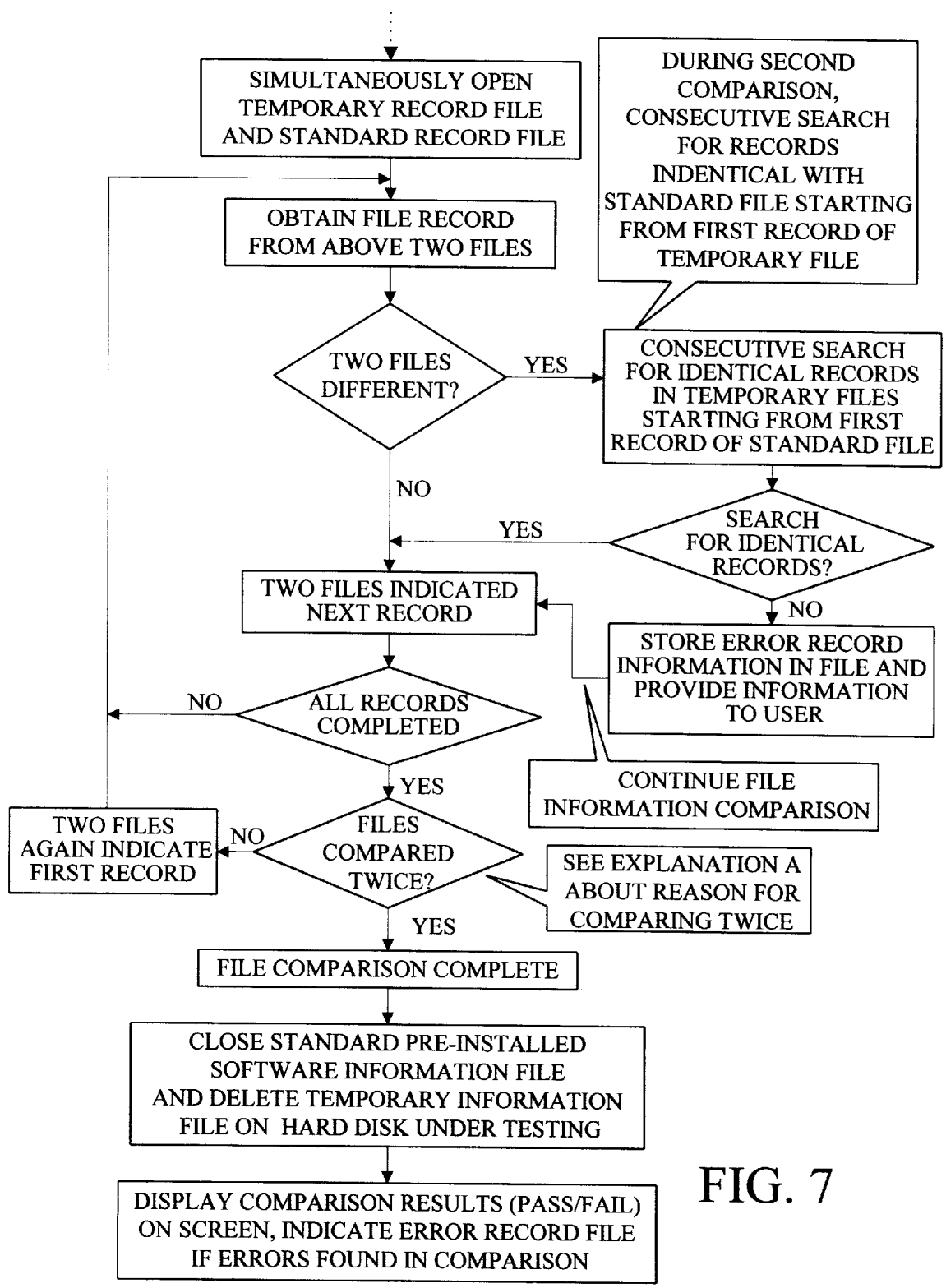
FIG. 7 is a flowchart diagram of the invention, which details the comparison of the aforesaid temporary file information with the aforesaid standard pre-installed software information.

After the invention has completed the creation of said temporary file information, said temporary file information is compared with the original standard pre-installed software information according to the following comparison procedures, as shown in FIG. 6:

(1) Said temporary file and said standard pre-installed software file are simultaneously opened and the corresponding records of these two files are read to compare with each other for determining whether the corresponding records of these two files are identical.

(2) If not identical, searching from the first record of said standard pre-installed software information to find the records identical to said temporary file; if identical records are not found, an error information will be recorded in the file and displayed on the screen for the reference of the operator.

(3) Otherwise, the invention reads the next corresponding records of these two files and continues the aforesaid comparison procedure until the comparison of all the records is completed.

During the aforesaid comparison process, the invention first considers the standard pre-installed software information as the original version and, after completing the comparison procedure for these two files, then considers said temporary file as an original file subjected to a second comparison. As such, the invention not only finds the installation errors of the pre-installed software on the hard disk being tested as well as the lost files of the pre-installed software, but also locates redundant files pre-installed on the hard disk during the test.

If no error is found during the entire testing process being completed, as shown in FIG. 6, the invention displays "PASS" on the screen; otherwise, an error indication will be displayed on the screen along with an error information record file to reminder the operator checking the erroneous file names, paths and error causes viewable from said error information record file (including information such as erroneous time, attribute, and file content as well as files that have been lost or added).

As stated in the foregoing description, the invention herein has been described in terms of the preferred embodiments, which shall not be construed as a limitation of the scope claimed by the invention. And, any similar modifications can easily be achieved by the individuals skilled in the art according to the disclosure of the invention shall be deemed as still within the scope of this invention.

What is claimed is:

1. Testing method of the integrity of software pre-installed in a computer hard disk, said method mainly includes the following procedures that are performed to test software pre-installed on a hard disk:

(1) First, utilizing a file information access function through a lower level operation to directly read data on the physical magnetic tracks of a hard disk and obtain file names, file sizes, file storage locations, and other information stored in all partitions, including hidden partitions and normal partitions;

(2) According to said information searching for hard disk partitions pre-installed with software being tested, instructing an operator to input the names of disregarded known files or directories, arranging said file and directory names inputted by the operator, and then storing said file and directory names in a designated file;

(3) After sequentially reading the record information of every file in the directories of said hard disk, comparing said record information with said disregarded known file and directory names; if the names are identical, skipping the disregarded files according to a disregard form; otherwise, storing the file information obtained;

(4) After reading and comparing every file record in the directories of said hard disk, then closing all the information files of said pre-installed software being tested and, furthermore, indicating completion and generating a standard pre-installed software information file;

(5) Opening the aforesaid file storing the disregarded known file and directory names;

(6) After the file information of the software pre-installed on the hard disk being read, eliminating the disregarded known file and directory names and, furthermore, storing the remaining file information in a temporary file; and (7) Finally determining whether errors have occurred in the information files of the software pre-installed on said hard disk by comparing said standard pre-installed software information with said temporary file, and, furthermore, recording information of errors while providing an indication as a reference to the operator.

2. The method in claim 1, said method further includes the procedures of reading a master boot record on said hard disk and locating the hidden partition on the said hard disk to automatically recognize the FAT format of said hard disk, determining what type of FAT being utilized in said hidden partition according to the type of file allocation table (FAT) format in said hidden partition and different preset functions and, with respect to the particular type of FAT, obtaining name, size, location and other information of the files stored in the hidden partition.

3. The method in claim 1, wherein said disregarded known file and directory names refer to several register and swap files that are internally created and altered by an operating system during the start-up routine of a computer.

4. The method in claim 1, wherein during the comparison of the disregarded known file and directory names in the directories of the hard disk, a standard pre-installed software information file is created mainly in accordance with the following procedures:

(1) Searching file directory areas according to master boot record information, and searching every file record in said areas; furthermore, converting the character groups of said file record being found into size and attribute and then storing the same in a file;

(2) After obtaining the starting location of the files actually stored on the hard disk from the directory areas, searching for other storage locations from a FAT according to said starting location, and then undergo rearrangement obtaining the storage address links of the entire files;

(3) Obtaining a check sum via a cyclic redundancy check operation on the data formed by the character groups being read according to said addresses; and (4) Finally, storing a calculated check code in said file, and thereby creating a standard pre-installed software information file.

5. The method in claim 1, wherein said standard pre-installed software information is compared with standard installed software information according to the following comparison procedures:

(1) Simultaneously opening said temporary file and said standard pre-installed software file, reading one record respectively from said two files sequentially and, furthermore, determining whether said records being read are identical;

(2) If not identical, searching from the first record of said standard pre-installed software information to find the records identical to the records in said temporary file; if identical record not being found, recording an error information in the file and displaying said error information to show that a record error has occurred in the file for the reference of the operator;

(3) Otherwise, respectively reading the next records from said two files and, furthermore, continuing said comparison procedure until comparison of all records is completed.

6. The method in claim 5, during said comparison process, said process can be proceeded by first considering the standard installed software information as the original version, and after completing said comparison procedures for said two files, then considering said temporary file as an original file to complete said comparison procedure.

7. The method in claim 1, claim 5 or claim 6, if no error being found during the entire testing process, displaying the result of passing the test on the screen when the entire testing process being completed; otherwise, displaying an error indication on the screen along with the corresponding error information record file.

\* \* \* \* \*